Figure 1:
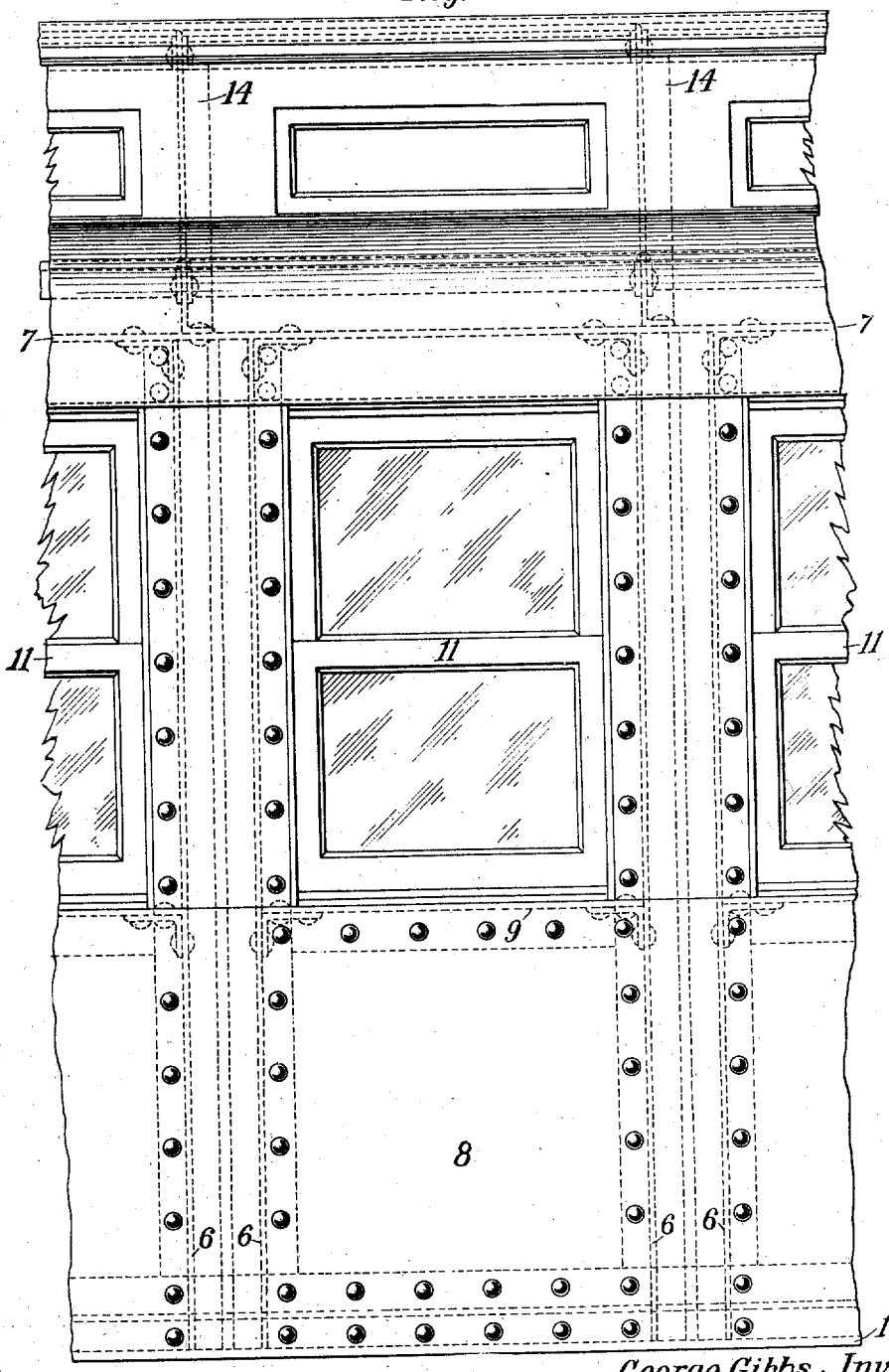

No. 12,268. REISSUED SEPT. 20, 1904.

G. GIBBS.

RAILWAY VEHICLE.

APPLICATION FILED APR. 1, 1904.

6 SHEETS—SHEET 1.

Witnesses:
Raphael Netter
S S Dunham

George Gibbs, Inventor by Kerr, Page & Cooper Att'ys.

No. 12,268. REISSUED SEPT. 20, 1904.

G. GIBBS.

RAILWAY VEHICLE.

APPLICATION FILED APR. 1, 1904.

6 SHEETS—SHEET 2.

Witnesses:
Raphael Netter
A. S. Dunham

Inventor
George Gibbs,
by Kerr, Page & Cooper Attys.

No. 12,268. REISSUED SEPT. 20, 1904.

G. GIBBS.

RAILWAY VEHICLE.

APPLICATION FILED APR. 1, 1904.

6 SHEETS—SHEET 3.

Witnesses:
Raphael Netter
S S Dunham

George Gibbs, Inventor by Kerr, Page & Cooper Attys.

No. 12,268. REISSUED SEPT. 20, 1904.

G. GIBBS.

RAILWAY VEHICLE.

APPLICATION FILED APR. 1, 1904.

6 SHEETS—SHEET 4.

Witnesses:
Raphael Netter
A. S. Dunham

George Gibbs, Inventor by Kerr, Page & Cooper Attys.

No. 12,268. REISSUED SEPT. 20, 1904.
G. GIBBS.
RAILWAY VEHICLE.
APPLICATION FILED APR. 1, 1904.
6 SHEETS—SHEET 5.
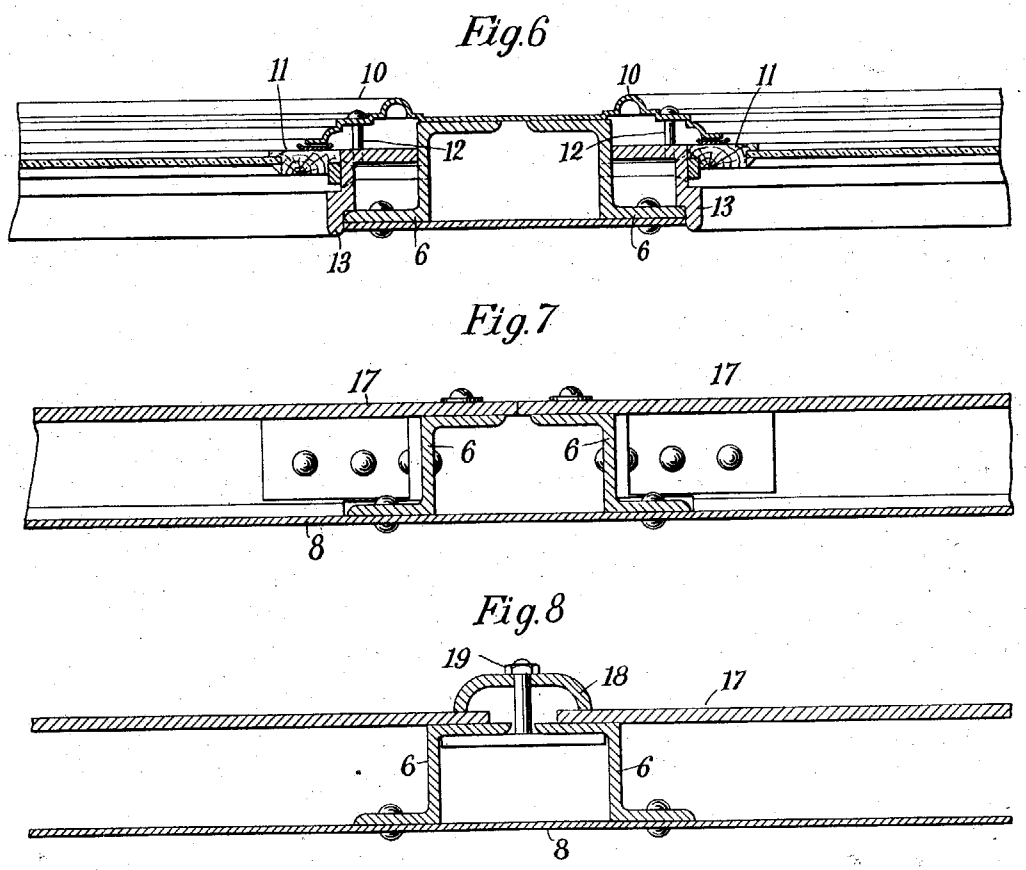
Witnesses:
Raphael Netter
S S Dunham
George Gibbs, Inventor
by Kerr, Page & Cooper Att'ys.

No. 12,268. REISSUED SEPT. 20, 1904.

G. GIBBS.

RAILWAY VEHICLE.

APPLICATION FILED APR. 1, 1904.

6 SHEETS—SHEET 6.

Witnesses:
Raphael Netter
S S Dunham

George Gibbs, Inventor by Kerr, Page & Cooper Attys.

No. 12,268. Reissued September 20, 1904.

UNITED STATES PATENT OFFICE.

GEORGE GIBBS, OF NEW YORK, N. Y.

RAILWAY-VEHICLE.

SPECIFICATION forming part of Reissued Letters Patent No. 12,268, dated September 20, 1904.

Original No. 739,074, dated September 15, 1903. Application for reissue filed April 1, 1904. Serial No. 201,154.

*To all whom it may concern:*

Be it known that I, GEORGE GIBBS, a citizen of the United States, and a resident of New York, in the county of New York and State of New York, have invented certain new and useful Improvements in Railway-Vehicles, of which the following is a specification.

One of the objects of my invention is to provide a railway passenger-car, more particularly an electric-motor car, which shall be little likely to take fire in case of accident or the derangement of the electrical apparatus. To this end I make the frame of the car of metal and provide the car with a non-metallic non-splintering lining, said lining being either entirely non-combustible or of slow-burning composition. Such a lining serves also the additional function of deadening sound and provides a heat and cold insulating partition, providing in this respect the requisite comfort for passengers in the car. An all-metal car would not fulfil these functions, and such a car would also be objectionable for use in connection with the electrical apparatus by reason of the danger of short circuits burning through the metal and causing alarm and possibly injury to the passengers. Accordingly a second object of my invention is to equip a metal car with a non-metallic lining not only for purposes of making the car fireproof, but also for securing the passengers against the extreme effects of heat and cold, which would be present in an unlined metallic car, and for deadening the sound which an all-metal car would transmit to the interior of the car. In electric-motor cars the dangers from electrical apparatus in respect to the causing of fires may be divided, broadly, into two classes: first, that arising from defects in the apparatus when in normal operation; second, that arising from short circuits, grounds, &c., in case of derailment, wreck, or any serious accident.

In another application for Letters Patent, filed on the 1st day of December, 1902, Serial No. 133,313, I have suggested as a means for providing against the first class of danger the mounting of the electrical apparatus, including the wiring, under the floor of the car and making the floor-lining of fireproof construction, an air-space being preferably provided between the electrical apparatus, including the wiring and the car-body. This mode of protection will generally be found effective; but in case of the more serious forms of railway accident it is always possible that short circuits will occur between feeders or collector-rails and the ironwork on the track or car, thus endangering the woodwork of the car when a car having wood in its construction is used. This danger of short circuits and of the exposure of the non-metallic portions of a metal car to electric arcs extends to the lining of such cars, whether such lining is of wood or other material. A special danger connected with the use of wood as a lining for a metal car arises from the splintering of the wood, whereby the danger of fire is greatly increased. I propose a new form of construction in which the car has an all-metal frame above the floor with a metallic outside sheathing, but with a lining of non-splintering board composition made either of wood-pulp fiber, preferably impregnated with metallic salts to make it non-flammable, or of composite board made of wood-pulp and asbestos or other non-combustible compositions capable of being formed into board of the requisite mechanical strength and toughness. When the principle of construction which I have developed is broadly considered, the exact composition of this lining is comparatively unimportant so long as the necessary qualities of mechanical strength and non-flammability and the characteristic of permitting distortion by bending instead of breaking or splintering are present.

Figure 2:
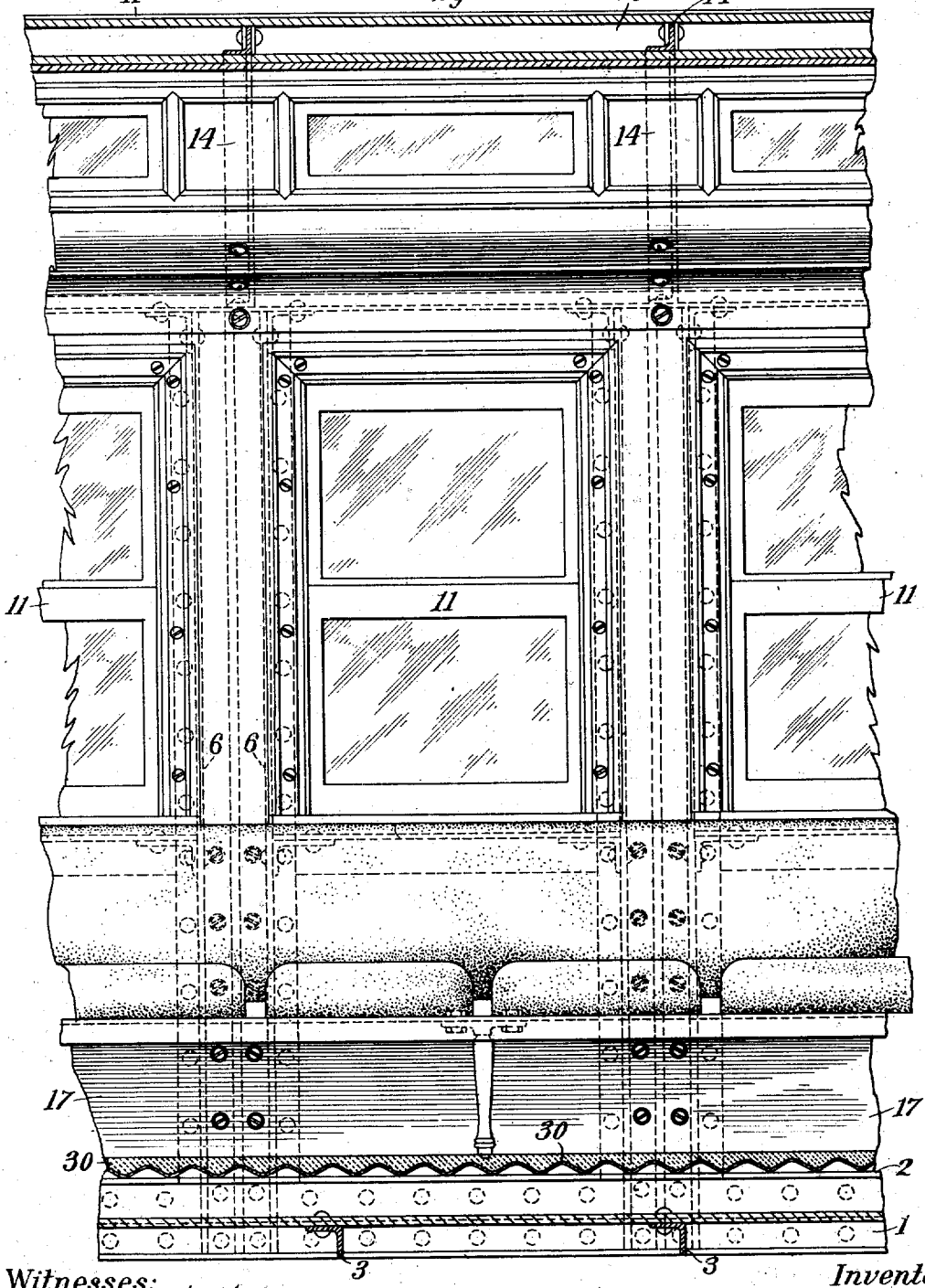
Figure 3:
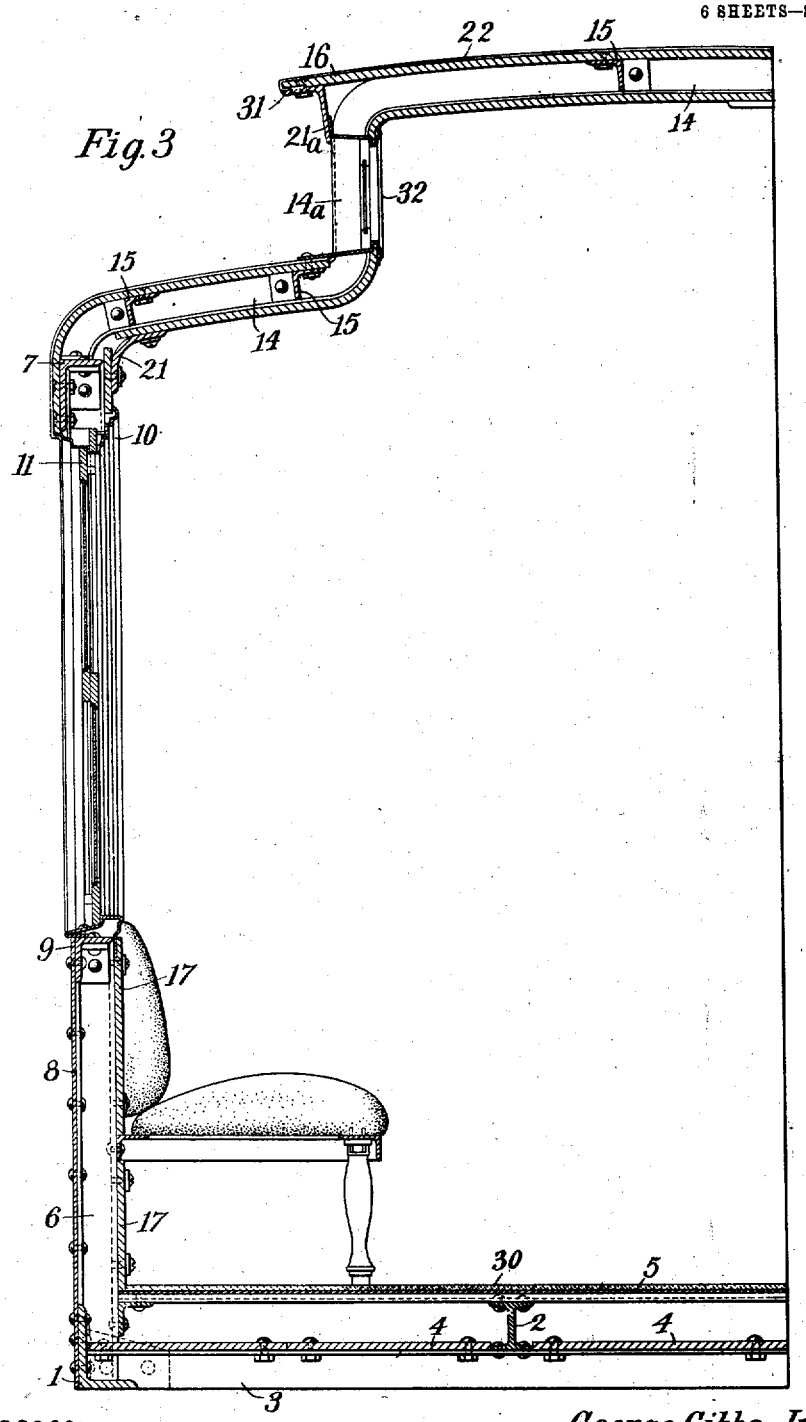
Figures 4, 5:
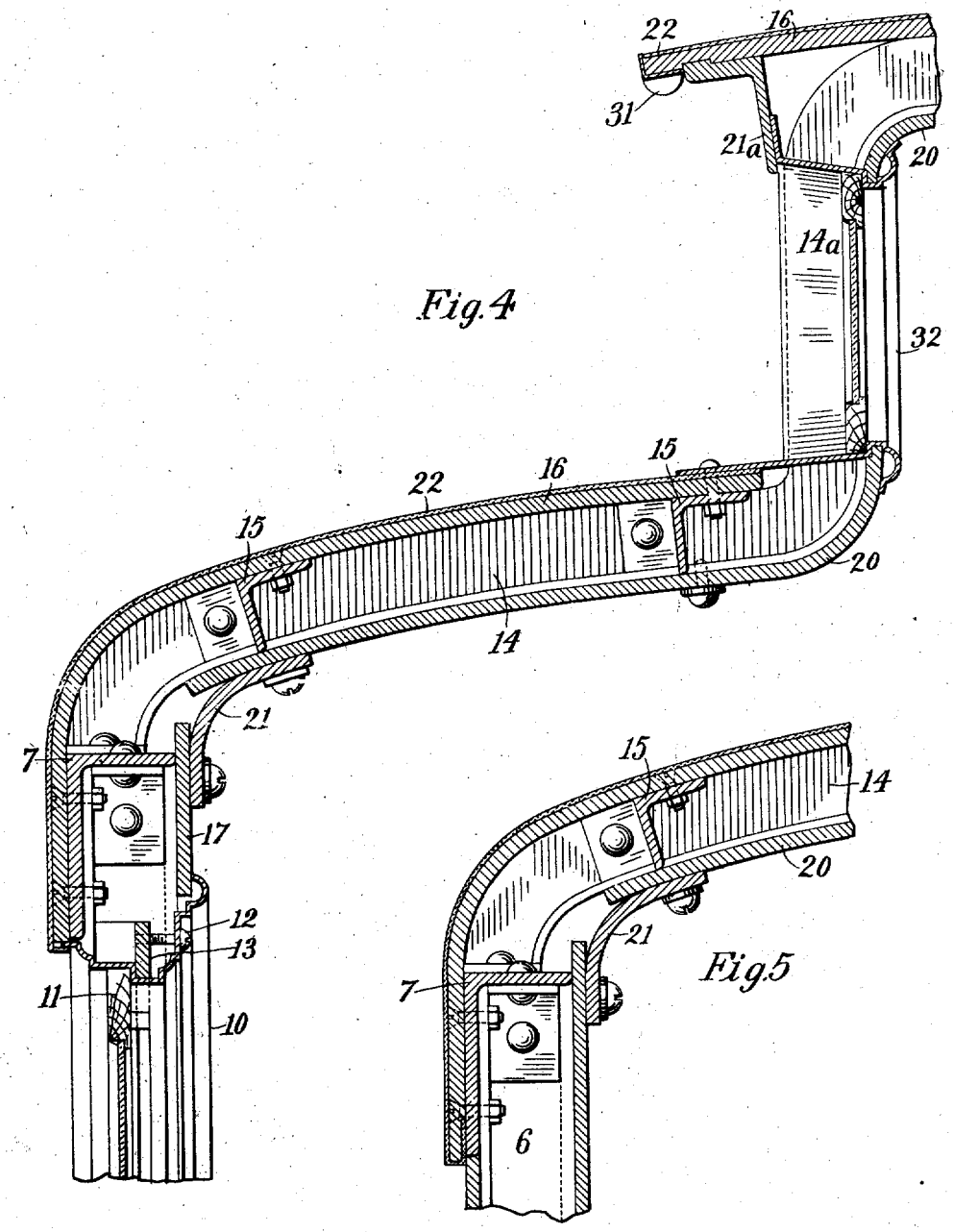
Figure 9:
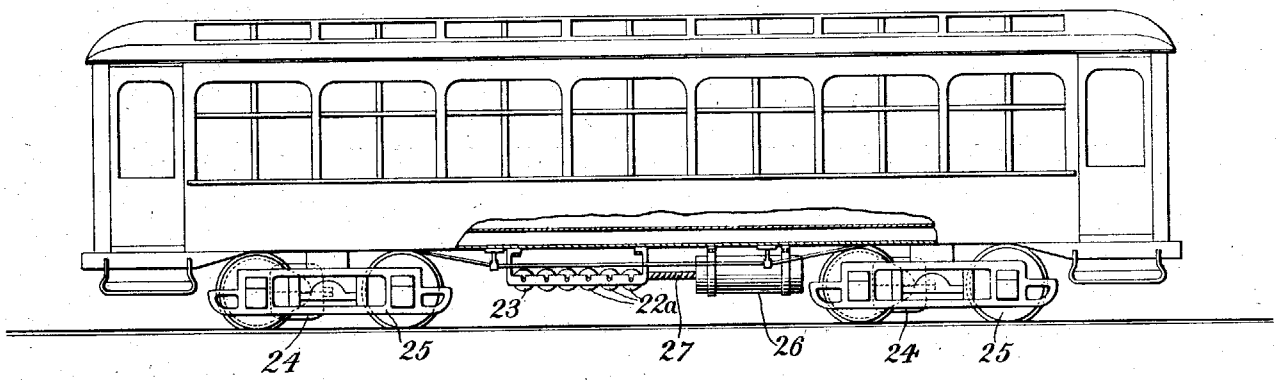

In the accompanying illustrative drawings, Figure 1 is an outside elevation of a portion of a railway passenger-car embodying my invention. Fig. 2 is an inside elevation of the same. Fig. 3 is a cross-section of one-half of the car-body. Fig. 4 is an enlarged detail view of the roof portion of Fig. 3. Fig. 5 is an enlarged detail view of the roof-corner construction between windows. Fig. 6 is a horizontal section through a window-post in the car-frame. Fig. 7 is a horizontal section through a post in the car-frame, taken on a plane below the car-window. Fig. 8 illustrates a modification of the construction shown in Fig. 7, and Fig. 9 is a view showing electrical car apparatus and wiring arranged underneath the floor of the car.

The floor-framing, as shown in Figs. 1, 2, and 3, may consist of angle side sills 1, channel center sills 2, running longitudinally of the car, and transverse angular bridge-pieces 3, these parts being of metal. Any other suitable metallic framing for the floor may be employed. The fireproofing and insulation of the floor may be formed by a board 4 of transite or similar fireproofing material laid on the top of the bridge-pieces 3. On top of the sills is laid a flooring 5 of sheet metal, which may be in the form of a corrugated sheet, and on top of this is placed a plastic flooring 30, of asbestos, magnesia composition, or other suitable material forming the floor-surface.

The side framing of the car is preferably formed of posts 6 6 of Z-iron, although they may be of other structural shapes, if found desirable. These Z-irons extend from the footing in the side angle 1 to a side roof-angle 7, being properly secured to the same by bolting or riveting or any other suitable means. The posts 6 6 form the vertical frame between the side windows and are so secured to the outside sheet-sheathing 8 of metal (see Figs. 1, 3, 5, and 8) as to form a vertical truss. The sheathing 8 is riveted to the posts 6 6 and extends from the bottom of the side sill 1 to a window-sill angle-piece 9 9. Around these posts between the windows finishing-strips 10 10 of pressed metal are secured. (See Fig. 6.) This finish is preferably made so as to hold the window-sash 11 in place and is secured by screws 12 12 to the window-frame castings 13 13, which are formed to serve as the window-jambs, with guides and stops for the sashes, as shown in Fig. 6. The strips 10 10 are preferably formed so as to exert a spring-pressure when screwed in place, and thus to hold the sash from rattling.

The roof construction is formed of metallic carlines 14 14, extending from one side of the car to the other, placed at the proper intervals for roof strength and suitably secured to the plates 7, as by rivets, as shown. The longitudinal frame between these carlines consists of angle-pieces or purlins 15 15, these angle-pieces being properly bolted, riveted, or otherwise secured to the carlines where they join or meet the same, the whole forming a stiff, light, longitudinally, and cross-braced roof-frame. It will be noted that the carlines and purlins are arranged with their flanges parallel with the inner and outer surfaces of the roof, the flanges thus serving as convenient supports for the roof-sheathings, to which flanges the said sheathings are secured. The outside roofing 16 may be of sheet metal or of the non-metallic lining material where lightness is desirable and is secured by bolting, riveting, or other means to the longitudinal roof angle-pieces 15 15. On the outer sheathing is a protecting sheet or layer 22. On the upper deck it is turned down and under the outer edges of the sheathing and secured by a strip 31, as shown.

The interior lining 17 consists of non-metallic non-splintering lining material below the window-sills and between and above the windows. This lining is secured to the posts by one of several alternative methods, examples of which are shown in Figs. 7 and 8. In Fig. 7 it is screwed or bolted directly to the Z-posts. In Fig. 8 the lining is held in place by vertical strips, as 18, preferably of metal, which are held in place by the T-bolts 19. The roof-lining consists of non-metallic sheets 20, bolted to the frame and secured by corner finish-strips 21 21, as necessary.

The upper-deck window-casings are formed by flaring box-shaped metal frames. (Shown at $14^a$, Fig. 4.) On the upper side of the box is a flange which is secured inside of and to the corner-piece $21^a$. The lower side of the box extends out upon the roof-sheathing 16. The inner finish of the casing is preferably formed of a metal molding 32.

In Fig. 9 I show a car which may be of the general construction hereinbefore described, such car being provided with electrical apparatus arranged underneath the floor. Thus I show in the said figure resistances $22^a$, supported in a frame 23, the frame being bolted or otherwise secured to the bottom of the car, either directly or indirectly. At 24 24 I indicate the motors, which are supported upon the trucks 25 25. The part 26 is a typical representation of a controller, and the wiring is indicated at 27.

I claim as my invention—

1. An electric-motor car having a frame of metal, a metallic outside sheathing, and an exposed lining of insulating, non-splintering, sound-deadening, non-combustible, or slow-burning material, in combination with electric motors suspended on the trucks and electrical controlling apparatus for the said motors, the major portion of the said controlling apparatus being located under the car-bottom.

2. In a railway-vehicle, a floor comprising a plurality of floor sills or supports, a corrugated metal sheet on the upper side of the supports, and a plastic layer or filling on the corrugated sheet, as set forth.

3. In a railway-vehicle, a floor comprising in combination a plurality of sills or supports, a corrugated metal sheet on the upper side of the supports, and a layer or filling of plastic magnesia composition.

4. In a railway-vehicle, in combination, a roof-frame composed of angle-carlines bent to form the cross-sectional shape of the roof and angle-purlins extending longitudinally of the vehicle, said carlines and purlins having their flanges parallel to the inner and outer surfaces of the roof; and inner and outer coverings or sheathings for the roof, held by the said flanges, as set forth.

5. In a railway-vehicle, in combination, a metal roof-frame shaped to form an upper deck, a window-casing consisting of a metal box, and flanges on the box for securing the casing to the roof-frame, as set forth.

6. In a railway-vehicle, the combination of vertical metallic posts, a metallic window-frame between the posts and pressed-metal finishing-strips adapted to exert a spring-pressure on the window-sash as set forth.

7. In a railway-vehicle, the combination of vertical metallic posts, a metallic window-frame between the posts, and finishing-strips of pressed metal covering the frame and secured thereto, as set forth.

8. In a railway-vehicle, the combination with a window-frame, of an inside finish of shaped metal, adapted to bear on the window-sash and exert a spring-pressure thereon, as set forth.

GEORGE GIBBS.

Witnesses:
W. T. THOMPSON,
S. S. DUNHAM.